United States Patent [19]

Kittrell et al.

[11] 4,246,234

[45] * Jan. 20, 1981

[54] METHOD AND APPARATUS FOR REDUCING NITRIC OXIDE

[75] Inventors: James R. Kittrell, Amherst, Mass.; Donald L. Herman, Coventry, R.I.

[73] Assignees: New England Power Service Company, Westborough, Mass.; Northeast Utilities Service Company, Berlin, Conn.

[*] Notice: The portion of the term of this patent subsequent to Mar. 21, 1995, has been disclaimed.

[21] Appl. No.: 909,869

[22] Filed: May 26, 1978

[51] Int. Cl.³ ............... B01D 53/36; B01J 8/04; B01J 8/06; F01N 3/28

[52] U.S. Cl. ................... 422/171; 422/176; 422/180; 422/181

[58] Field of Search .......... 422/171, 176, 177, 180, 422/211, 222, 181; 423/239 R, 351, 235, 239 A; 252/439

[56] References Cited

U.S. PATENT DOCUMENTS

| | | | |
|---|---|---|---|
| 2,699,989 | 1/1955 | Houdry | 422/180 |
| 2,718,460 | 9/1955 | Bowen | 422/171 |
| 2,898,201 | 8/1959 | Hayes | 422/180 |
| 3,259,454 | 7/1966 | Michalko | 422/177 |
| 3,507,627 | 4/1970 | Frant et al. | 422/222 |
| 3,563,912 | 2/1971 | Young | 252/439 |
| 3,850,846 | 11/1974 | Kravitz et al. | 252/439 |
| 3,857,921 | 12/1974 | Tamura et al. | 423/239 |
| 3,914,390 | 10/1975 | Kuao et al. | 423/239 |
| 3,933,979 | 1/1976 | Eisenlohr et al. | 423/239 |
| 3,981,971 | 9/1976 | Saito et al. | 423/239 A |
| 4,002,723 | 1/1977 | Inaba et al. | 423/239 A |
| 4,018,710 | 4/1977 | Oshimura et al. | 423/239 |
| 4,043,939 | 8/1977 | Kasaoka | 423/239 A |
| 4,061,597 | 12/1977 | Goldstein et al. | 423/351 |
| 4,078,898 | 3/1978 | Fedor et al. | 422/180 |
| 4,080,426 | 3/1978 | Kittrell et al. | 423/351 |
| 4,087,250 | 5/1978 | Lave et al. | 422/171 |
| 4,089,930 | 5/1978 | Kittrell et al. | 423/351 |
| 4,104,360 | 8/1978 | Megverian et al. | 422/177 |
| 4,107,272 | 8/1978 | Mori et al. | 423/351 |

*Primary Examiner*—Bradley R. Garris
*Attorney, Agent, or Firm*—Paul J. Cook

[57] ABSTRACT

A method and apparatus for reducing nitric oxide in a gas with ammonia in the presence of a base metal catalyst pretreated with sulfur, selenium or a sulfur compound positioned in a reactor. The catalyst is deposited on a substrate or confined between gas-permeable walls and arranged to form open channels through which the nitric oxide-containing gas thereby effects low pressure drop through the reactor.

8 Claims, 9 Drawing Figures

METHOD AND APPARATUS FOR REDUCING NITRIC OXIDE

BACKGROUND OF THE INVENTION

This invention relates to a method and apparatus for catalytically reducing nitric oxide with ammonia in a reactor having channels arranged to provide a low pressure drop through the reactor.

Nitrogen oxides, particularly nitric oxide, are undesirable products of reaction which result when carbonaceous fuels are burned such as in power plant operations.

Various techniques have been proposed for removing nitric oxides from gaseous streams to prevent pollution of the atmosphere, such as absorption, scrubbing and catalytic conversion.

Catalytic reduction of nitric oxides with ammonia or hydrogen in the presence of nickel and oxides of iron and chromium has been proposed (U.S. Pat. No. 2,381,696; U.S. Pat. No. 3,800,796; and German Pat. No. 1,259,298). The reaction is exothermic and without control of the temperature in the catalyst bed, combustion of the ammonia is likely to occur.

Removal of nitric oxides from tail gas streams of nitric acid plants has been attempted by reaction with ammonia, hydrogen or methane over a catalyst consisting of a supported metal of the platinum group. Anderson et al, Ind. Eng. Chem., Vol. 53, p. 199 (1961) and Adlhart et al, Chem. Eng. Prog., Vol. 67, pp. 73–78 (1971). With this method, there has been difficulty with control of the exothermic reaction, which results in pressure surges and overheating of the reactor. Also, in some instances, hydrogen cyanide is produced as a by-product.

In power plant emissions, the gaseous effluent typically contains as the major source of pollutants sulfur oxides or sulfur dioxide and nitric oxides. It has been found possible to separate the sulfur dioxide from the effluent and to treat the sulfur dioxide separately or to control the fuel sulfur content. This results in an effluent primarily containing sulfur dioxide as less than 2000 ppm, nitric oxide, oxygen and nitrogen and water vapor.

The prior art methods for catalytically reducing nitric oxide with ammonia as a reducing gas experience problems with the temperature of operation required to maintain the efficiency of the catalyst employed, deterioration of the catalyst, controlling exothermic reactions and preventing the formation of byproducts which are pollutants, particularly nitrous oxide.

The use of a base metal catalyst to reduce nitric oxide to nitrogen with ammonia in the presence of oxygen and sulfur dioxide has been suggested, German Pat. No. 1,259,298. However, the catalyst life is limited and no controls are provided for the prevention of the formation of nitrous oxide and the exothermic reaction is difficult to control. Further, in similar component systems for the reduction of nitric oxide to nitrogen with ammonia, the use of a copper promoted catalyst on a catalytic support such as alumina, silica or diatomacous earth is suggested, U.S. Pat. No. 3,008,796. The reaction rates are not such that such a process would be considered economically possible for the treatment of a gaseous stream such as from a power plant emission. The elimination or inhibition of the formation of undesirable by-products is not controlled.

In addition, the presently employed catalytic processes for nitric oxide removal have utilized a fixed or fluid bed arrangement through which the gaseous stream is passed for conversion of nitric oxide. In these arrangements, two basic problems are encountered which seriously inhibit their commercial use. First, the pressure drop within the reactor caused by the catalyst bed provides substantial economic disadvantages, particularly in pollution control of nitric oxide-containing stack gases. Second, the ash and soot particles normally present in stack gases tend to accumulate on the surface of the catalyst which causes rapid catalyst deactivation.

It would be desirable to provide a catalyst system which permits substantially complete conversion of nitric oxides to innocuous reaction products. In addition, it would be desirable to provide a means for utilizing such a catalytic process wherein pressure drop caused by the catalyst in the reactor can be minimized and wherein deposition of solid particles from the gas being treated to the catalyst also can be minimized.

SUMMARY OF THE INVENTION

The present invention is broadly directed to the catalytic reduction of nitric oxide to nitrogen with ammonia as a reductant. More particularly, the invention provides a high percent conversion of nitric oxide to nitrogen with ammonia while avoiding or minimizing the formation of undesirable byproducts such as nitrous oxide. The invention is directed to the pretreatment of a base metal catalyst selected from the group consisting essentially of copper, iron, chromium, nickel, molybdenum, cobalt, vanadium, the lanthanides and the antinides or any combinations thereof with a nonmetallic element selected from Group VI A of the periodic system.

In a preferred embodiment, the base metal catalysts, copper, vanadium and iron either alone or any combination thereof are pretreated with a sulfur compound and/or selenium. The treated catalyst is then employed for the reduction of nitric oxide to nitrogen in a component system of ammonia, oxygen and an inert gas.

In the catalytic reduction of nitric oxide to nitrogen in a multi-component system of nitric oxide, oxygen, ammonia and an inert gas several reactions are believed to occur. The more important reactions are:

$$6NO + 4NH_3 \rightarrow 5N_2 + 6H_2O$$

$$16NO + 4NH_3 \rightarrow 10N_2O + 6H_2O$$

$$3O_2 + 4NH_3 \rightarrow 2N_2 + 6H_2O$$

$$4O_2 + 4NH_3 \rightarrow 2N_2O + 6H_2O$$

$$5O_2 + 4NH_3 \rightarrow 4NO + 6H_2O$$

In a system of nitric oxide and oxygen with ammonia, to reduce the nitric oxide with or without sulfur dioxide added, using a noble metal catalyst, both nitrogen and nitrous oxide are formed.

In a system of nitric oxide, oxygen and a controlled amount of sulfur dioxide using a base metal catalyst, the nitric oxide is reduced to nitrogen with substantially no nitrous oxide formation. Where the amount of sulfur dioxide in the system is unknown, either no sulfur dioxide or no controlled amount of sulfur dioxide, both nitrogen and nitrous oxide are formed.

In the present invention, base metal catalysts are pretreated and for a system of nitric oxide and oxygen with ammonia using a base metal catalyst, substantially no nitrous oxide is formed. This pretreatment eliminates the necessity of controlling the amount of sulfur dioxide, if any, in the system to eliminate the undesirable by-product nitrous oxide when nitric oxide is reduced to nitrogen with ammonia using a base metal catalyst.

The method of the invention broadly comprises pretreating a base metal catalyst from the group consisting essentially of ferric oxides, vanadium oxides and copper oxides by contacting the catalysts with a pretreatment stream comprising a vaporizable sulfur compound such as dimethyl sulfide, hydrogen sulfide, sulfur dioxide, carbon disulfide or elemental sulfur; or selenium to impregnate the catalyst. Ammonia is blended with a gaseous stream comprising nitric oxide and oxygen to form a blended stream which contacts the pretreated catalyst. The nitric oxide is reduced to nitrogen with substantially no nitrous oxide formation. To promote the formation of metal sulfides on the catalyst or the deposition of sulfur, the pretreatment stream preferably comprises $H_2$ or $NH_3$. The pretreatment step is preferably conducted at temperatures between about 400° F. to 900° F. The time of pretreatment or exposure will depend upon the temperature used, and is generally between about 2 hours to 24 hours, preferably between 2 hours to 10 hours, the shorter duration at the higher temperatures. The composition of vaporizable sulfur compound or selenium compound in the pretreatment stream may be 0.1% to 10%, preferably 0.2% to 2%. The catalyst is arranged within the reactor in discrete segmented areas between which areas channels are provided for gas flow through the reactor. The size of the channels is controlled so that there is sufficient contact of gas and catalyst to substantially completely reduce the nitric oxide in the gas.

DESCRIPTION OF SPECIFIC EMBODIMENTS

Figure 1:
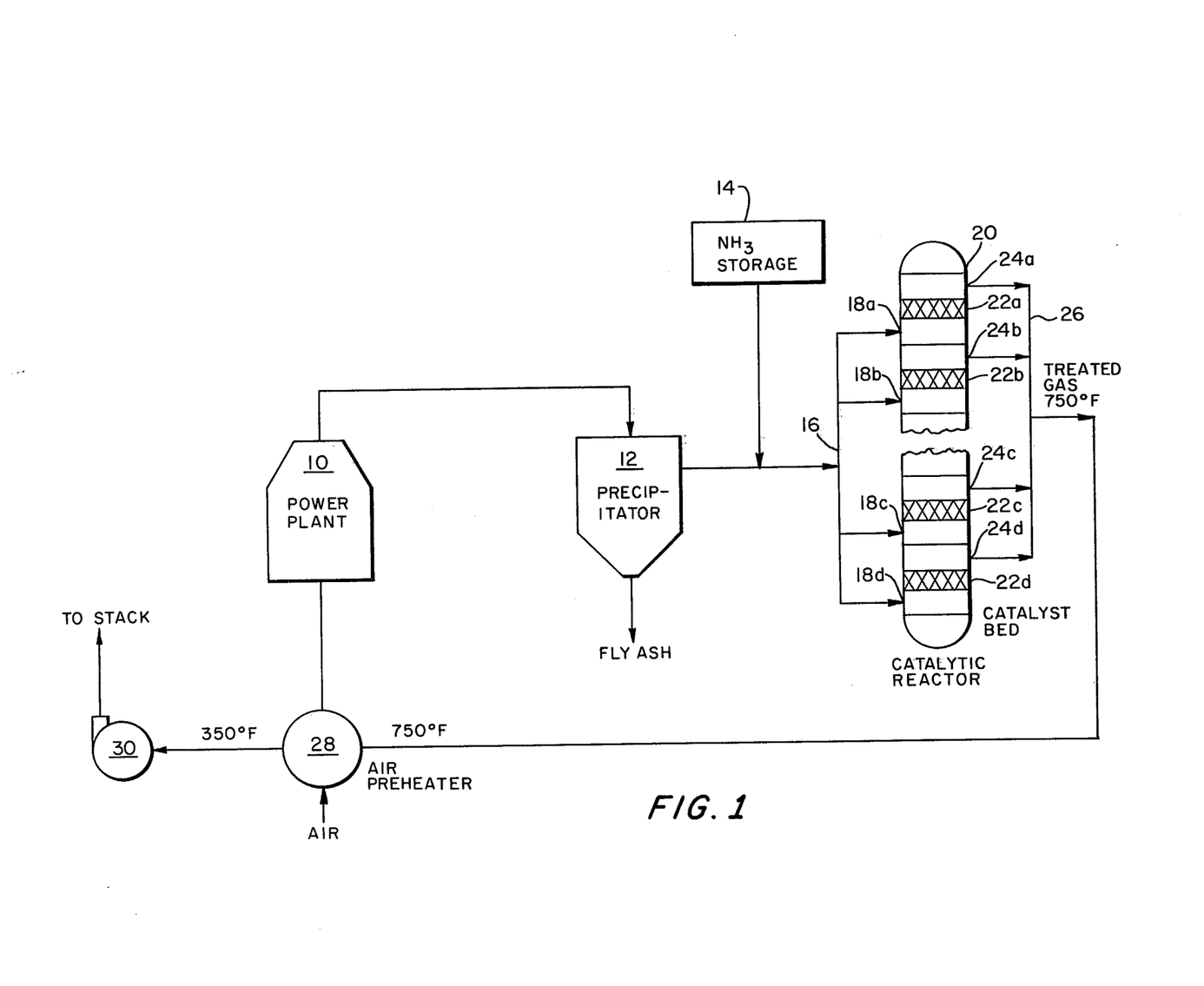
FIG. 1 is a process flow diagram of a preferred embodiment of this invention.

Referring to FIG. 1, a power plant, 800 mw capacity, is shown at 10, and emits a flue gas stream at between about 200° F., preferably between 300° F. to 800° F., say for example at 700° F. and at a rate of approximately $200 \times 10^6$ cubic feet per hour. A representative composition of the flue gas is set forth below in Table I, it being understood that the composition will vary depending on operating conditions and the type of fuel being consumed.

TABLE I

| Comp. | Comp. of Flue Gas | |
|---|---|---|
| | Vol. % | lb/hr |
| $CO_2$ | 14.5 | $1.512 \times 10^6$ |
| $O_2$ | 3.0 | $2.275 \times 10^5$ |
| $SO_2$ | 0.2 | $3.039 \times 10^4$ |
| $NO_x$ | 0.075 | $5.329 \times 10^3$ |
| Fly Ash | 0.2 | — |

The remainder is comprised of $N_2$ & $H_2O$

The stream is discharged from the power plant 10 having the above composition and is introduced to a precipitator 12 where approximately 95% of the fly ash is removed. The stream is discharged from the precipitator 12 less the removed fly ash, and ammonia from a source 14 is blended as a reductant gas with the stream to form a blended stream. This blended stream flows to a manifold 16 where it is introduced into a catalytic reactor 20 through a plurality of inlets 18a-d. The ammonia flow rate is dependent on the ammonia-nitric oxide ratio. For this example, Table II lists a range of mole ratios and the associated amount of ammonia available for the subsequent catalytic reaction.

TABLE II

| $NH_3/NO$ mole ratio | lb $NH_3$/hr. |
|---|---|
| 0.7 | 2115.5 |
| 0.8 | 2417.7 |
| 0.9 | 2720.0 |
| 1.0 | 3022.1 |

The catalytic reactor comprises a plurality of catalytic arrangements 22a-d. The streams introduced flow through the catalytic arrangements where the following reaction primarily occurs.

$$6NO + 4NH_4 \rightarrow 5N_2 + 6H_2O$$

The catalyst employed in this particular embodiment is 10% $V_2O_5$ on alumina such as available from Harshaw Chemical and designated VO301, which has been pretreated. The percent reduction of nitric oxide in the blended stream under the conditions set forth herein exceeds 80% and may be approximately 100% with no nitrous oxide formation. A representative composition discharged from the catalytic reactor 20 through outlets 24a-d and through manifold 26 is set forth in Table III.

TABLE III

| Comp. of Reacter Exit Gas (after electrostatic precipitation) | |
|---|---|
| Comp. | Vol. % |
| $CO_2$ | 14.5 |
| $O_2$ | 2.9 |
| $SO_2$ | 0.2 |
| $NO_x$ | 0.020 |
| Fly Ash | 0.01 |

This reduced stream at between about 300° F. to 800° F., say for example 700° F., is introduced into a heat exchanger 28 where it is cooled by incoming air to about 350° F. It is then discharged to the stack by a conventional fan 30.

The $V_2O_5$ on alumina is pretreated to ensure that there is substantially no nitrous oxide formed, whether or not there is sulfur dioxide present in the stream. The catalyst is contacted with a stream of 2% dimethyl sulfide and 2% hydrogen in helium at a temperature of between about 500° F. and 700° F., say for example 600° F., for a period of between about 4 to 8 hours, say for example 6 hours. After pretreatment, the catalyst is placed on supports in a manner described below.

Other base metal catalysts which may be similarly pretreated are copper, iron, chromium, nickel, molybdenum, cobalt, or appropriate combinations thereof, normally supported on a high surface area material such as alumina, silica alumina, or zeolites. In the pretreatment of the catalyst, other suitable compounds which may be used include hydrogen sulfide, sulfur dioxide, carbon disulfide or elemental sulfur; or selenium at operating conditions similar to those set forth above.

In an alternative embodiment, the invention may be utilized for NO removal from the exhaust of a turbine generator employing equipment functionally equivalent to that shown in the drawing. A turbine generator with a capacity of about 20 MW discharges an exhaust of about $30 \times 10^5$ cubic feet per hour. A representative composition of the exhaust is set forth below in Table IV, it being understood that the composition will vary depending upon operating conditions and the type of fuel being consumed.

TABLE IV

| Composition | Comp. of Exhaust Gas Vol. Frac. | lb/hr |
|---|---|---|
| $O_2$ | .16 | $16.42 \times 10^6$ |
| $SO_x$ | $28 \times 10^{-6}$ | 57.30 |
| NO | $114 \times 10^{-6}$ | 107.6 |
| CO | $5 \times 10^{-6}$ | 4.397 |

The stream discharged from the generator, having the above composition, is introduced into a catalytic reactor substantially identical to that shown in the drawing and described in reference to the preferred embodiment of the invention. A reductant gas, more particularly, ammonia, is blended with the exhaust gas stream and introduced through a manifold to a catalytic reactor at a temperature of between about 500° F. to 1100° F., say for example 900° F. The ammonia-nitric oxide molar ratio may vary between 0.7 to 1.0. The following Table V lists the mole ratios and required amount of ammonia necessary for the subsequent catalytic reaction.

TABLE V

| $NH_3/NO$ Mole Ratio | lb. $NH_3$/hr |
|---|---|
| 0.7 | 42.72 |
| 0.8 | 48.82 |
| 0.9 | 54.93 |
| 1.0 | 61.03 |

The catalyst employed in this alternative embodiment is $V_2O_5$ supported on alumina, which is pretreated as described in the preferred embodiment. The percent reduction of nitric oxide under the conditions set forth herein can exceed 80% with substantially no nitrous oxide formation. A representative composition discharged from the catalytic reactor is set forth below in Table VI.

TABLE VI

| Composition | Comp. of Reactor Exit Gas Vol. Frac. |
|---|---|
| $O_2$ | .15 |
| $SO_x$ | $28 \times 10^{-6}$ |
| NO | $50 \times 10^{-6}$ |

TABLE VI-continued

| Composition | Comp. of Reactor Exit Gas Vol. Frac. |
|---|---|
| CO | $5 \times 10^{-6}$ |

The catalyst is confined within preselected areas of a reactor such that open channels are maintained within the reactor to permit gas flow through the reactor while minimizing an accompanying pressure drop within the reactor. The catalyst can be adhered to a solid formed substrate formed to attain the desired catalyst geometry such as tubes, rods, rigid screens, plates or the like. The material comprising the solid-formed substrate itself may or may not have catalytic activity for the reduction of nitric oxide with ammonia. Alternatively, the catalyst particles can be confined by an open mesh screen which compacts the particles into the desired geometric configuration while permitting the gas being treated to pass into contact with the catalyst for reduction of nitric oxide. Generally, the screen is formed of metal wire and has a mesh size between about 0.002 inch and 0.1 inch in order to provide gas-catalyst contact while retaining the catalyst within the screen.

The catalyst particles can be used on the substrate or compacted either as the catalyst per se or supported in a matrix or other materials such as silica, alumina, zircon, magnesia, titania or the like. When utilized in compact form rather than being adhered to a formed substrate, the catalyst can be powdered, granular or molded such as spheres or pellets of finely divided particles having a particle size of about 60 mesh up to about ¼ inches.

The reaction of nitric oxide and ammonia is effected on the catalyst surfaces whereby the reactants contact the catalyst by diffusion from the gas passing through the open channels in the reactor. The solid particles in the gas such as soot and ash are carried by the gas through the channels so that they are not deposited on the catalyst. To minimize solid particle deposition from the gas, it is preferred that the channels in the reactor be parallel to the overall flow of the gas. Also, parallel channels minimize pressure drop within the reactor. However, it is to be understood that the catalyst can be arranged within the reactor to form convoluted channels to improve gas-catalyst contact since even these arrangements provide substantially less solid particle deposition on the catalyst as compared to a fixed or fluidized bed of catalyst. In addition, even though a convoluted channel arrangement within the reactor effects a greater pressure drop within the reactor as compared to a parallel channel, these arrangements provide less pressure drop as compared to a fixed or fluidized bed of catalyst.

The length and width of the channels are chosen in order to permit substantially complete reduction of nitric oxide. The gas is passed through the reactor at a linear velocity which assures turbulent gas flow so that adequate contact of gas and catalyst is obtained. Generally suitable linear gas velocities are within the range of between about 5 ft/sec and 50 ft/sec, more usually between about 30 ft/sec and 50 ft/sec. The overall length of the channels, whether straight or convoluted is the adequate substantially complete reduction of nitric oxide while minimizing pressure drop in the reactor. Generally, the length of the channels are between about 2 ft and 40 ft, more usually between about 5 ft and 15 ft. The width of the channels generally is between about 0.1 inch and 1 inch, more usually between about 0.1 inch and 0.5 inch.

The invention will now be described with reference to the accompanying FIGS., 2 through 9. The reactor shown in FIGS. 2 and 3 utilizes channels for gas which extend parallel to gas flow. The reactor 10 includes an inlet conduit 12 and a header 14. A plate 16 extends across the cross-sectional area of the reactor 10 and is secured to the reactor shell wall 18 of the reactor by any conventional means. The plate is provided with holes through which tubes 20 are fitted so that they are secured into the desired position. The tubes 20 are secured at their ends by two plates (one of which is not shown) and the reactor 10 is provided with a suitable outlet (not shown). The tubes 20 can be replaced by removal from the plates when desired and replaced with tubes containing fresh catalyst.

Figures 2, 3, 4:
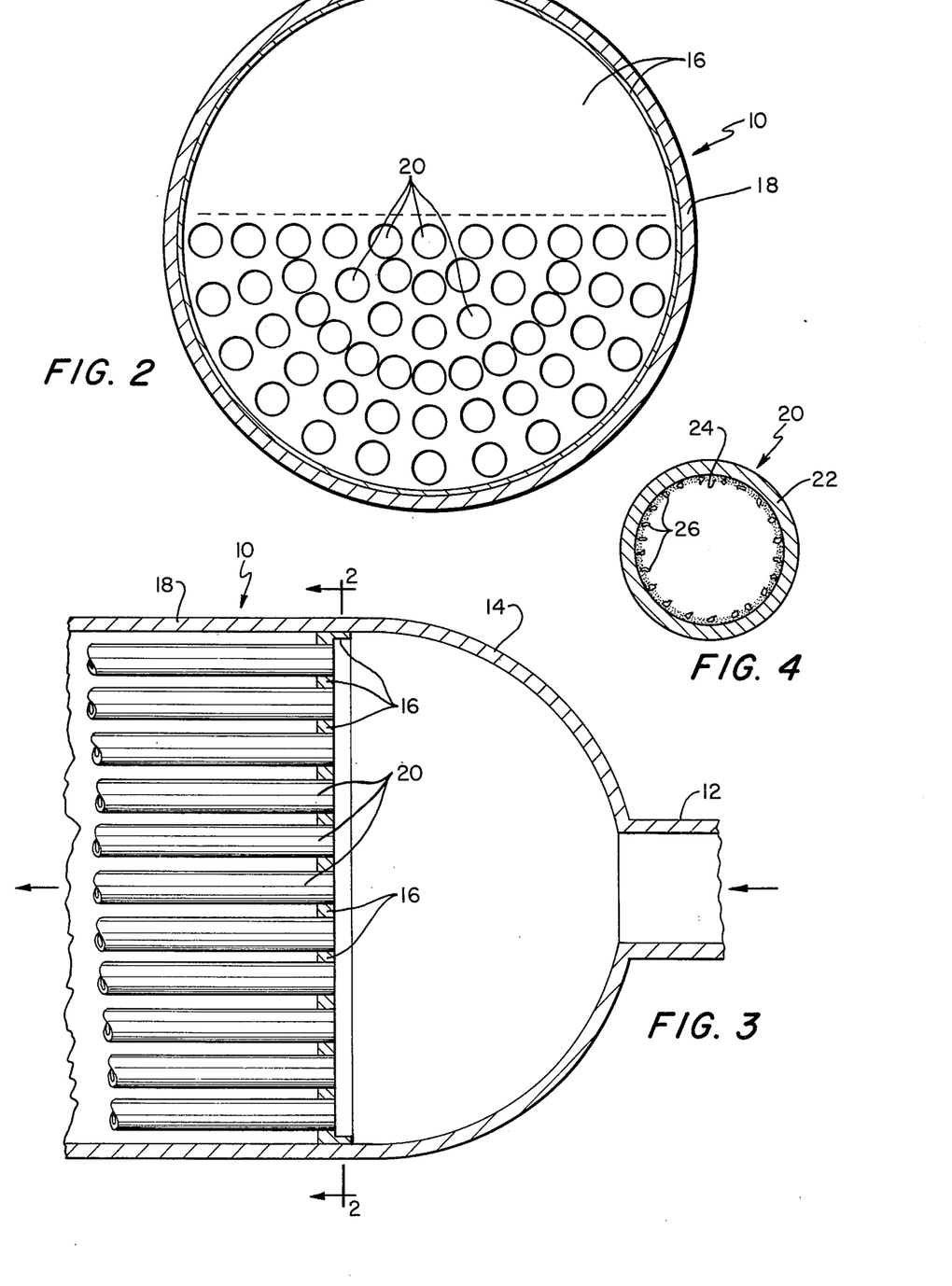
FIG. 2 is a front view of a reactor utilized in the present invention.
FIG. 3 is a partial cross-sectional side view of the reactor of FIG. 2.
FIG. 4 is a cross-sectional view of a coated reactor tube useful in the reactor of FIGS. 2 and 3.

As shown in FIG. 4, the tubes 20 comprise a wall 22, an adhesive layer 24 such as commercially available Do All cement of Wonder-King Chem. Corp., Thermalox of the Dampney Co., or Cotronics 985 of the Cotronics Corp. and catalyst particles 26 adhered to the wall 22 by the adhesive 24.

Figures 5, 6:
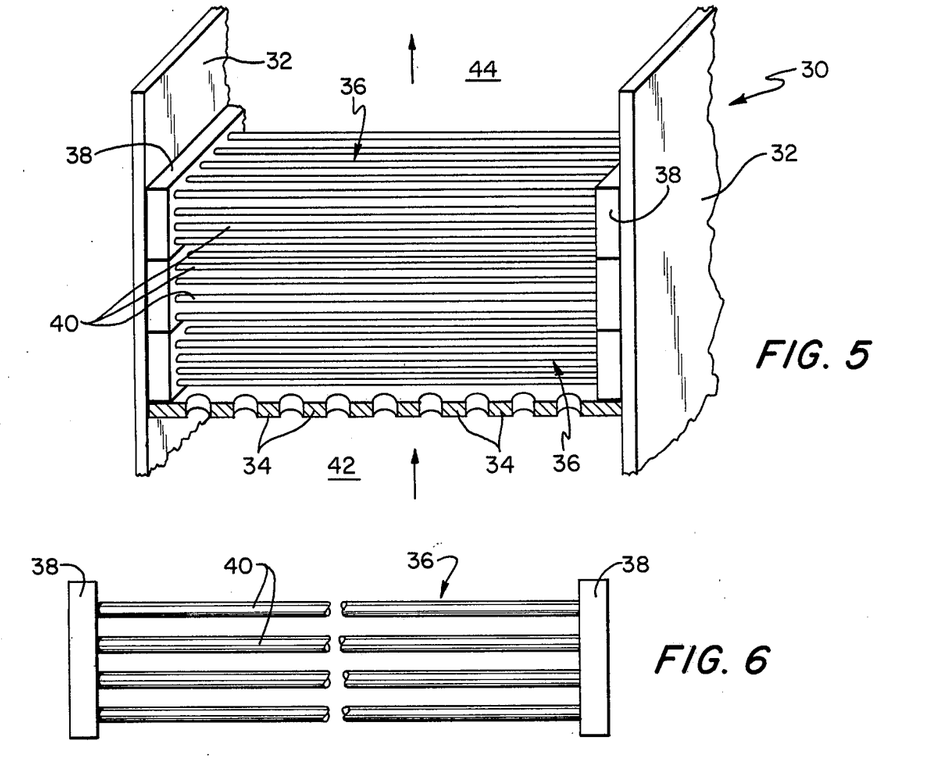
FIG. 5 is a cross-sectional side view of an alternative reactor of this invention.
FIG. 6 is a top view of a reactor module useful in the reactor of FIG. 5.

Referring to FIGS. 5 and 6, a reactor system is shown wherein the catalyst is coated on rods in a modular arrangement. The reactor 30 includes walls 32 and a porous support plate 34 having a plurality of holes 36. The plate 34 is secured to the walls 32 and provides support for the catalyst modules 36. The catalyst modules comprise end supporting members 38 and rods 40 extending between the supporting members and secured thereto. The rods 40 are coated with catalyst-containing particles by being adhered thereto in the manner described above. Incoming gas enters plenum chamber 42 and passes through the modules 36 in either parallel or convoluted flow as desired and to plenum chamber 46. While in contact with the catalyst-coated rods 40, the nitric oxide is reduced with ammonia. After the catalyst on the rods 40 has become deactivated, the modules can be removed and replaced with new modules containing active catalyst. The reactor shown in FIGS. 2–6 can be formed integrally with existing stacks for flue gas or can be added to a stack so that the flue gas is removed from the stack, passed through the reactor and reintroduced into the stack. Furthermore, more than one reactor can be employed on a given stack.

Figures 7, 8:
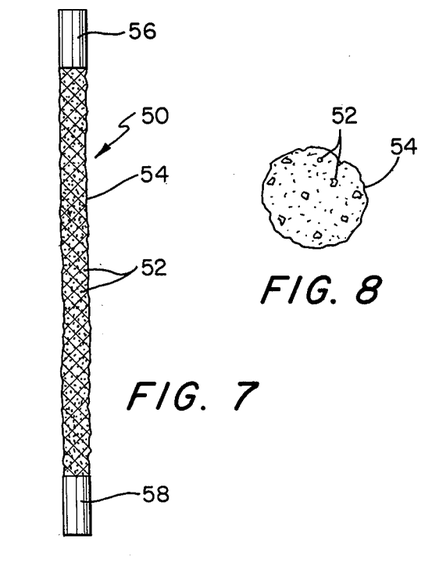
FIG. 7 is an alternative catalyst module that can be utilized in the reactor of FIGS. 2 and 3.
FIG. 8 is a cross-sectional view of one embodiment of the module of FIG. 7.
Figure 9:
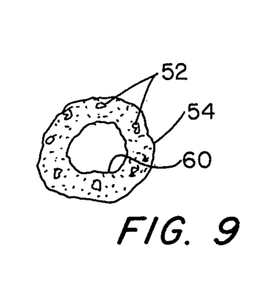
FIG. 9 is a cross-sectional view of an alternative embodiment of the module of FIG. 7.

The catalyst modules shown in FIGS. 7 through 9 are alternative embodiments to the tubes and rods described above and can be substituted therefor if desired. The catalyst module 50 comprises catalyst particles 52 which are retained in a generally tubular or rod shape by mesh screen 54 and stoppers 56 and 58 which are attached to screen 54. As shown in FIGS. 8 and 9, the particles 52 can be confined in a rod-like shape or in a tubular shape by screen 54 or screens 54 and 60. It is to be understood that the particles can be confined within a mesh screen in any shape desired such as a flat, plate-like structure, a circular plate, a spirally-wound plate or the like.

The following examples illustrate the present invention and are not intended to limit the same. Examples I–III illustrate the improved activity of the catalysts per se. Example IV illustrates the use of the catalyst in the catalyst configuration of this invention.

EXAMPLE I

Samples of six commercially available catalysts were used as received to reduce nitric oxide by ammonia in the absence of sulfur dioxide, as set forth in Table VII below.

TABLE VII

| Catalyst Type | Manufacturer | Identification |
|---|---|---|
| 10% CuO on alumina | Harshaw | CuO803 |
| Cr promoted iron oxide | Girdler | G3A |
| Copper Chromite | Girdler | G13 |
| 3% Pt on alumina | Matthey Bishop | MB30 |
| 10% $V_2O_5$ on alumina | Harshaw | VO301 |
| 10% $V_2O_5$ on silica alumina | Harshaw | VO701 |

Approximately 3 grams of each catalyst was changed to individual ¼ inch diameter aluminum reactors and placed in a Lindberg Heavi-Duty furnace. A feed mixture comprising approximately 520 ppm $NH_3$, 600 ppm NO, 5000 ppm $O_2$ and the balance He was passed over these catalysts at a space velocity of 380 std. cc/gm-min. The results are set forth in Table VIII.

TABLE VIII

| Catalyst Type | Temperature, °F. | PPM Product Gas Composition NO | $N_2O$ |
|---|---|---|---|
| 3% Pt on alumina | 431 | 11 | 392 |
| 3% Pt on alumina | 457 | 10 | 405 |
| 3% Pt on alumina | 506 | 46 | 374 |
| 3% Pt on alumina | 557 | 79 | 353 |
| 10% CuO on alumina | 430 | 79 | 119 |
| 10% CuO on alumina | 457 | 81 | 153 |
| 10% CuO on alumina | 507 | 119 | 252 |
| 10% CuO on alumina | 556 | 139 | 331 |
| Copper chromite | 430 | 181 | 108 |
| Copper chromite | 458 | 149 | 131 |
| Copper chromite | 507 | 187 | 194 |
| Copper chromite | 557 | 258 | 275 |
| Cr promoted iron oxide | 433 | 175 | 153 |
| Cr promoted iron oxide | 460 | 203 | 267 |
| Cr promoted iron oxide | 509 | 219 | 297 |
| Cr promoted iron oxide | 559 | 220 | 301 |
| 10% $V_2O_5$ on alumina | 432 | 44 | 55 |
| 10% $V_2O_5$ on alumina | 459 | 59 | 86 |
| 10% $V_2O_5$ on alumina | 508 | 70 | 42 |
| 10% $V_2O_5$ on alumina | 559 | 222 | 322 |
| 10% $V_2O_5$ on silica alumina | 433 | 220 | 59 |
| 10% $V_2O_5$ on silica alumina | 460 | 140 | 106 |
| 10% $V_2O_5$ on silica alumina | 508 | 83 | 93 |
| 10% $V_2O_5$ on silica alumina | 560 | 197 | 279 |

By comparison to the inlet NO level, it can be seen that substantial quantities of NO have been converted, but that the bulk of it has been converted to $N_2O$, an undesirable byproduct, rather than to $N_2$, the desired product.

EXAMPLE II

The catalysts of Example I were tested in a similar fashion, except approximately 2000 ppm of sulfur dioxide was added to the feed mixture of Example I. The results obtained are set forth in Table IX. It can be seen from the table that the addition of sulfur dioxide to the feed of the non-noble metal catalysts has reduced the undesirable formation of $N_2O$ to zero, with $N_2$ being the only reaction product in these cases. The addition of sulfur dioxide did not inhibit the formation of $N_2O$ for the platinum catalyst however.

TABLE IX

| Catalyst Type | Temperature °F. | Downstream NO | Concentration N$_2$O |
|---|---|---|---|
| 3% Pt on alumina | 457 | 165 | 419 |
| 3% Pt on alumina | 506 | 131 | 404 |
| 3% Pt on alumina | 553 | 143 | 449 |
| 10% CuO on alumina | 455 | 455 | 0 |
| 10% CuO on alumina | 505 | 342 | 0 |
| 10% CuO on alumina | 557 | 91 | 0 |
| Copper chromite | 455 | 534 | 0 |
| Copper chromite | 506 | 477 | 0 |
| Copper chromite | 553 | 415 | 0 |
| Cr promoted iron oxide | 457 | 470 | 0 |
| Cr promoted iron oxide | 507 | 273 | 0 |
| Cr promoted iron oxide | 559 | 29 | 0 |
| 10% V$_2$O$_5$ on alumina | 458 | 63 | 0 |
| 10% V$_2$O$_5$ on alumina | 508 | 0 | 0 |
| 10% V$_2$O$_5$ on alumina | 560 | 0 | 0 |
| 10% V$_2$O$_5$ on silica alumina | 459 | 155 | 0 |
| 10% V$_2$O$_5$ on silica alumina | 510 | 19 | 0 |
| 10% V$_2$O$_5$ on silica alumina | 561 | 0 | 0 |

| Gas Compositions and Operating Conditions | |
|---|---|
| O$_2$ concentration | 13% |
| CO$_2$ concentration | 6% |
| SO$_2$ concentration | 50 ppm |
| NO$_x$ concentration | 300–405 ppm |
| H$_2$O concentration | 8% |
| NH$_3$/NO mole ratio | 0.9 to 1.1 |

EXAMPLE III

The catalysts of Example I are exposed to a stream of 2% dimethyl sulfide and 2% H$_2$ in helium for 6 hours at 600° F., and were tested at the conditions of Example I with no sulfur dioxide added to the feed to the reactors. Substantially no production of N$_2$O is observed for the non-noble metal catalysts, with the only reaction product being N$_2$ and the downstream concentration of NO and N$_2$O being substantially the same as in Table IX. This pretreatment with dimethyl sulfide does not inhibit N$_2$O formation with the platinum catalyst.

EXAMPLE IV

An aluminum tube was coated on its interior surface with Harshaw VO301, Vanadium-alumina, catalyst pretreated by sulfur dioxide by the methods set forth in the table below utilizing a mixture of Saulreisen 33 cement manufactured by Saulreisen Cement Company, Pittsburgh, Pa., and water. The mixture was poured into a 3/8 inch diameter aluminum tube 12 inches long. The mixture was allowed to coat the inner wall with a layer about 1/16 inch thick. The catalyst then was packed into the tube and the cement was allowed to dry. The loose catalyst was shaken out.

A gas having the composition shown below was introduced into the tube at elevated temperatures and the extent of NO$_x$ conversion was determined.

The extent of conversion is as follows:

TABLE X

| | | 1 | 2 | 3 | 4 | 5 |
|---|---|---|---|---|---|---|
| | Wt of Catalyst (g) | 1.17 | 1.25 | <0.05 | 2.5 | 1.4 |
| | Wt of Cement (g) | 1.03 | 0.25 | <0.05 | 2.6 | 4.6 |
| | Application Method | A | B | C | D | E |
| | (1) Temp. | 750 | 750 | 630 | 630 | 630 |
| | (2) Space Vel.[1] | 64×10$^3$ | 53×10$^3$ | >1.7×10$^6$ | 35×10$^3$ | 51×10$^3$ |
| Reaction | (3) Area Vel.[2] | 130 | 93 | 240 | 242 | 195 |
| Conditions | (4) NO$_{in}$, PPM | 405 | 405 | 300 | 300 | 300 |
| | (5) SO$_{2in}$, PPM | 50 | 50 | 50 | 50 | 50 |
| | (6) (NH$_3$/NO)$_{in}$ | 1.5 | 1.5 | 1.2 | 1.2 | 1.2 |
| | (7) % NO Conv. | 72 | 40 | 70 | 13 | |

(1) Based on bulk density of Harshaw V0301
(2) Based on the gas stream flow rate at STP conditions/area of uncoated tube.
A, E: Fine mixture of catalyst, cement coated to tube. B: 20/30 mesh catalyst coated on top of cement layer. C: Coating mixture was "knocked" off tube leaving only afine "adhesive owder" remaining.
D: Smooth thick coating of a fine catalyst/cement mixture.

EXAMPLE V

To reduce nitric oxides with ammonia from a nitric oxide containing flue gas originating from a home heating furnace, a vertically placed reactor was used with a gas inlet at the top and a gas outlet at the bottom. The reactor comprised essentially two parallel screen bags, each of which was 0.5 inch thick, 1.0 inch wide and 12.0 inches long. These bags contained 1/8 inch pellets of vanadia on alumina and the screen had openings of 0.0331 inch (20 mesh). The screen bags were placed inside a 2 inch Al pipe.

Two tests were carried out with the catalyst in the same reactor. Some data are given in Table XI.

TABLE XI

| | Test I | Test II |
|---|---|---|
| Inlet NO$_x$ ppm | 480 | 540 |
| Conversion of NO$_x$ | 31.25./. | 36.1 |
| Gas hourly space velocity | | |
| std. Cft/Cft/hr | 82000 | 64000 |
| Reactor Temp. °F. | 700 | 700 |
| Packed Bed Comparative Test | | |
| Inlet NO$_x$ ppm | 500 | |
| Conversion NO$_x$ | 57./. | |
| Space velocity hr$^{-1}$ | | |
| std. conditions Cft/Cft/hr | 67000 | |
| Flue Gas Analysis (V/V) | | |
| CO$_2$ | 7.9./. | |
| O$_2$ | 11.6./. | |
| N$_2$ | 72.5./. | |
| H$_2$O | 8.0./. | |

EXAMPLE VI

An aluminum tube was coated on its interior surface with Harshaw VO301 catalyst by utilizing Thermalox Protective Coating, manufactured by the Dampney Company, Everett, Mass. The Thermalox was poured into a ⅜ inch diameter aluminum tube six inches long. The Thermalox was allowed to coat the inner wall with a very thin layer. The Harshaw VO301 then was packed into the tube and the Thermalox was allowed to dry. The loose Harshaw VO301 was then shaken out.

A gas having the composition shown below was introduced into the tube at elevated temperatures and the extent of $NO_x$ conversion was determined.

TABLE XII

| | |
|---|---|
| $O_2$ concentration: | 13% |
| $CO_2$ concentration: | 6% |
| $SO_2$ concentration: | 50 ppm |
| $NO_x$ concentration: | 310–430 |
| $H_2O$ concentration: | 8% |
| $NH_3/NO$ mole ratio: | 0.9–1.1 |
| Space Velocity, STP: | 76,000 hr$^{-1}$ |

The extent of conversion is as follows:

TABLE XIII

| TEMP (°F.) | A 470 | B 505 | C 530 | D 560 | E 595 | F 625 | G 650 | H 680 | I 705 | J 735 | K 770 | L 820 |
|---|---|---|---|---|---|---|---|---|---|---|---|---|
| $\left\{ \dfrac{(SV)_R}{1000} (hr^{-1}) \right\}^1$ | 109 | 113 | 116 | 120 | 124 | 127 | 130 | 134 | 137 | 140 | 144 | 148 |
| $NO_{in}$, (PPM) | 360 | 390 | 390 | 430 | 400 | 340 | 320 | 325 | 318 | 315 | 310 | 310 |
| $(NH_3/NO)_{in}$ | 1.0 | 0.9 | 0.9 | 1.1 | 1.0 | 1.0 | 1.1 | 1.1 | 1.1 | 1.0 | 1.0 | 1.1 |
| $NO_{out}$, (PPM) | 260 | 210 | 180 | 170 | 130 | 80 | 60 | 60 | 50 | 45 | 30 | 39 |
| % NO Conv. | 28 | 46 | 54 | 60 | 68 | 76 | 81 | 82 | 84 | 86 | 90 | 87 |
| $(AV)^2$, STP | 1,510 cm/hr | | | | | | | | | | | |
| $(SV)^1$, STP | 76,000 | | | | | | | | | | | |
| Catalyst at | 0.5 grams | | | | | | | | | | | |

$^1$(SV) is based on the bulk density of Harshaw VO103 ¼″ pellets
$^2$(AV) is defined as the gas flow rate divided by the surface area of the tube coating that is in contact with the flue gas

EXAMPLE VII

An aluminum tube was coated on its interior surface with Harshaw VO103 catalyst by utilizing a mixture of Sauereisen #33 cement, manufactured by Sauereisen Cement Company, Pittsburgh, Pa., and water. The mixture, after first being mixed with a measured amount of catalyst, was poured into a ⅜ inch diameter aluminum tube six inches long. A smooth channel, ⅛ inch in diameter, was kept empty to be used as a channel. After the mixture was allowed to dry, loose particles were shaken from the tube.

A gas having the composition shown below was introduced into the tube at elevated temperatures and the extent of $NO_x$ conversion was determined.

TABLE XIV

| | |
|---|---|
| $O_2$ concentration: | 13% |
| $CO_2$ concentration: | 6% |
| $SO_2$ concentration: | 50 ppm |
| $NO_x$ concentration: | 340–380 |
| $H_2O$ concentration: | 8% |
| $NH_3/NO$ mole ratio: | 0.9–1.1 |
| (S.V.), STP: | 36,000 hr$^{-1}$ |

The extent of conversion is as follows:

TABLE XV

| TEMP (°F.) | A 430 | B 510 | C 550 | D 590 | E 630 | F 680 | G 730 | H 770 |
|---|---|---|---|---|---|---|---|---|
| $\left\{ \dfrac{(SV)_R}{1000} (hr^{-1}) \right\}^1$ | 48 | 52 | 54 | 56 | 59 | 61 | 64 | 66 |
| $NO_{in}$, (PPM) | 370 | 370 | 370 | 370 | 380 | 370 | 360 | 340 |
| $(NH_3/NO)_{in}$ | 0.9–1.1 | | | | | | | |
| $NO_{out}$, (PPM) | 250 | 210 | 190 | 170 | 160 | 140 | 130 | 130 |
| % NO Conv. | 32 | 43 | 49 | 54 | 58 | 62 | 64 | 62 |
| $(AV)^2$, STP | 6,800 cm/hr | | | | | | | |
| $(SV)^1$, STP | 36,000 hr$^{-1}$ | | | | | | | |
| Catalyst at | 2.5 grams | | | | | | | |

We claim:

1. Apparatus for reducing nitric oxide by contact of a gaseous mixture containing nitric oxide and ammonia with a catalyst selected from the group consisting of copper, vanadium, iron, molybdenum and mixtures thereof, which catalyst has been pretreated with a compound selected from the group consisting of sulfur, dimethyl sulfide, hydrogen sulfide, carbon disulfide, selenium and mixtures thereof at a temperature between about 400° F.–900° F. to form a pretreated catalyst which comprises a reactor shell, a plurality of elongated solid supports within said shell coated with said pretreated catalyst, said supports being arranged within said shell and being separated from each other to provide open passages comprising a substantial portion of the cross-sectional area of said shell, and gas inlet and gas outlet means attached to said shell.

2. The apparatus of claim 1 wherein said supports comprise metal tubes arranged to extend parallel to the direction of gas flow within said shell.

3. The apparatus of claim 1 wherein said supports comprise metal rods.

4. The apparatus of claim 3 wherein said rods are arranged to extend in a direction substantially perpendicular to the direction of gas flow within said shell.

5. The apparatus of claim 1 wherein said pretreated catalyst is in particulate form and is confined into a shaped structure by a porous mesh screen.

6. The apparatus of claim 5 wherein said pretreated catalyst is confined into a rod-like shape.

7. The apparatus of claim 5 wherein said pretreated catalyst is confined into a tube-like shape.

8. The apparatus of claim 1 wherein a plurality of said supports are secured to common second support means to form a module and wherein said shell contains a plurality of said modules.

* * * * *